United States Patent
Visagie et al.

(10) Patent No.: US 7,524,787 B2
(45) Date of Patent: Apr. 28, 2009

(54) PRODUCING SUPPORTED COBALT CATALYSTS FOR THE FISHER-TROPSCH SYNTHESIS

(75) Inventors: Jacobus Lucas Visagie, Sasolburg (ZA); Hans Marcel Veltman, Utrecht (NL)

(73) Assignees: Sasol Technology (Proprietary Limited), Johannesburg (ZA); Engelhard De Meern B.V., The Meern (NL)

( * ) Notice: Subject to any disclaimer, the term of this patent is extended or adjusted under 35 U.S.C. 154(b) by 0 days.

(21) Appl. No.: 11/597,848

(22) PCT Filed: Dec. 22, 2005

(86) PCT No.: PCT/IB2005/054375

§ 371 (c)(1),
(2), (4) Date: Jun. 5, 2007

(87) PCT Pub. No.: WO2006/075216

PCT Pub. Date: Jul. 20, 2006

(65) Prior Publication Data

US 2007/0287759 A1 Dec. 13, 2007

Related U.S. Application Data

(60) Provisional application No. 60/642,937, filed on Jan. 11, 2005.

(51) Int. Cl.
*B01J 38/10* (2006.01)
*B01J 23/40* (2006.01)
*B01J 23/42* (2006.01)
*B01J 27/25* (2006.01)

(52) U.S. Cl. .................... 502/53; 502/201; 502/326; 502/327

(58) Field of Classification Search .......... 502/201, 502/260, 325, 326, 327, 53
See application file for complete search history.

(56) References Cited

U.S. PATENT DOCUMENTS

| 5,728,918 | A | * | 3/1998 | Nay et al. | 585/733 |
| 5,929,126 | A | * | 7/1999 | Koveal et al. | 518/709 |
| 6,239,184 | B1 | * | 5/2001 | Beer et al. | 518/709 |
| 6,337,353 | B1 | | 1/2002 | Lapidus et al. | |
| 6,486,220 | B1 | * | 11/2002 | Wright | 518/709 |
| 6,559,191 | B1 | * | 5/2003 | Koveal et al. | 518/709 |

(Continued)

FOREIGN PATENT DOCUMENTS

EP 0 533 227 3/1993

(Continued)

*Primary Examiner*—Cam N. Nguyen
(74) *Attorney, Agent, or Firm*—Ladas & Parry

(57) ABSTRACT

A process for producing a supported Fischer-Tropsch catalyst includes treating, in an activation stage (12), a particulate pre-reduction cobalt nitrate-based supported Fischer-Tropsch synthesis catalyst precursor containing reducible cobalt oxides, with hydrogen as a reducing gas in order to reduce the cobalt oxides over a period of time to Co, with ammonia and water being formed, the reduction including a time period when predominantly CoO is reduced to Co. Unreacted hydrogen is withdrawn (20), which thus includes water and treated to lower its dewpoint (14). At least a portion of the withdrawn unreacted hydrogen is returned to the activation stage (12) as recycle hydrogen (26). An ammonia concentration is maintained in the activation stage (12), at least during the time when predominantly CoO is reduced to Co, of less than 250 volume parts per million ('vppm').

5 Claims, 2 Drawing Sheets

U.S. PATENT DOCUMENTS

| | | | |
|---|---|---|---|
| 6,596,781 B1 * | 7/2003 | Schinski | 518/700 |
| 6,753,351 B2 * | 6/2004 | Clark et al. | 518/700 |
| 6,777,451 B2 * | 8/2004 | Koveal et al. | 518/710 |
| 6,800,579 B2 * | 10/2004 | Daage et al. | 502/38 |
| 6,869,978 B2 * | 3/2005 | Wright et al. | 518/709 |
| 6,919,290 B2 * | 7/2005 | Clarkson et al. | 502/53 |
| 6,962,947 B2 * | 11/2005 | Wright et al. | 518/709 |
| 7,012,104 B2 * | 3/2006 | Espinoza et al. | 518/715 |
| 2002/0052289 A1 | 5/2002 | Manzer et al. | |
| 2003/0144129 A1 * | 7/2003 | Clark et al. | 502/28 |
| 2003/0144366 A1 * | 7/2003 | Daage et al. | 518/715 |
| 2003/0166451 A1 * | 9/2003 | Koveal et al. | 502/38 |
| 2004/0127585 A1 * | 7/2004 | Raje | 518/715 |
| 2004/0204504 A1 | 10/2004 | Malek et al. | |

FOREIGN PATENT DOCUMENTS

WO          92/06784      4/1992

* cited by examiner

PRODUCING SUPPORTED COBALT CATALYSTS FOR THE FISHER-TROPSCH SYNTHESIS

This application claims the benefit of U.S. Provisional Application No.: 60/642,937 filed 11 Jan. 2005 and incorporates the same by reference.

THIS INVENTION relates to catalysts. It relates in particular to a process for producing a supported Fischer-Tropsch catalyst, and to a catalyst obtained from the process.

It is known to prepare a supported Fischer-Tropsch catalyst precursor by impregnating a particulate catalyst support with cobalt nitrate ($Co(NO_3)_2.6H_2O$), and calcining the impregnated support. Such a precursor is hereinafter also referred to as a "pre-reduction cobalt nitrate-based supported Fischer-Tropsch synthesis catalyst precursor". Such a precursor can then, in an activation process or step, be reduced by means of hydrogen, to obtain an active Fischer-Tropsch catalyst which contains cobalt crystallites as active component of the catalyst. Any residual nitrogen present in the precursor can be converted to ammonia ($NH_3$) during the activation process.

It is well known to those skilled in the art that for activating cobalt Fischer-Tropsch catalyst precursors with hydrogen on a commercial scale, it is imperative to recycle the hydrogen, thus ensuring that the hydrogen usage is not excessive.

The Applicant has found that, particularly when the active Fischer-Tropsch catalyst is produced on a commercial scale, higher than desired levels of Co are present in a wax supernatant of an active Fischer-Tropsch catalyst coated with wax i.e. the wax top layer of a solidified mixture of an active Fischer-Tropsch catalyst and a wax, in which the catalyst has settled down and the top layer is mainly wax. This higher than desired levels of Co in the wax supernatant may lead to submicron cobalt contamination of the Fischer-Tropsch synthesis wax product produced during the initial stages of a start-up of a commercial Gas-to-Liquids plant or directly after any on-line addition of fresh catalyst. The Fischer-Tropsch synthesis wax product is defined as the hydrocarbon product that is a liquid at the applied Fischer-Tropsch synthesis conditions and that is withdrawn as such from the reactor. Low or no cobalt concentrations in the wax supernatant of an active Fischer-Tropsch catalyst coated with wax is therefore desirable. The Applicant has found that, particularly when the active Fischer-Tropsch catalyst is produced on a commercial scale, the cobalt concentration in the wax supernatant can at times be higher than desirable.

It is an object of this invention to provide a process which can be used on a commercial scale to produce a supported Fischer-Tropsch catalyst that has an acceptable cobalt concentration in the wax supernatant of a solidified mixture of active Fischer-Tropsch catalyst and wax.

According to a first aspect of the invention, there is provided a process for producing a supported Fischer-Tropsch catalyst, which process includes treating, in an activation stage, a particulate pre-reduction cobalt nitrate-based supported Fischer-Tropsch synthesis catalyst precursor containing reducible cobalt oxides, with hydrogen as a reducing gas in order to reduce the cobalt oxides over a period of time to Co, with ammonia and water being formed, the reduction including a time period when predominantly CoO is reduced to Co;

withdrawing unreacted hydrogen, which thus includes water, from the activation stage, treating the unreacted hydrogen to lower its dewpoint and returning at least a portion of the withdrawn unreacted hydrogen to the activation stage as recycle hydrogen; and maintaining an ammonia concentration in the activation stage, at least during the time when predominantly CoO is reduced to Co, of less than 250 volume parts per million ("vppm").

The ammonia concentration in the activation stage can be measured, per definition, in an outlet hydrogen gas stream directly after the hydrogen gas stream exits the activation reactor prior to any gas treatment steps.

Preferably, the ammonia concentration in the activation stage is maintained, at least during the time when predominantly CoO is reduced to Co, at less than 70 vppm, more preferably at less than 45 vppm.

During the reduction of the cobalt oxides to Co, the particulate pre-reduction cobalt nitrate-based supported Fischer-Tropsch synthesis catalyst precursor is heated at a controlled rate and the reduction is thus effected at elevated temperatures. During the reduction of the cobalt oxides to Co, variations in the dewpoint of the unreacted hydrogen withdrawn from the activation stage, and variations in the hydrogen consumption, occur, with both typically showing two peaks as the temperature is increased, if the product of calcination is assumed to be $Co_3O_4$. The reduction of CoO to Co is typified by the peak occurring at the highest temperature, and thus either dewpoint data or hydrogen consumption data, or both, can in practice be used to determine when predominantly CoO is being reduced to Co. Broadly, this occurs at temperatures between about 250° C. and about 425° C., typically between about 275° C. and about 400° C.

Maintaining the ammonia concentration in the activation stage, at least during the time when predominantly CoO is reduced to Co, at less than 250 vppm, preferably at less than 70 vppm, more preferably at less than 45 vppm, may include removing $NH_3$ from the unreacted hydrogen. The $NH_3$ may be removed by contacting the unreacted hydrogen with an $NH_3$ adsorbent. Suitable adsorbents are well-known to those skilled in the art and are easily identified from literature.

Treating the unreacted hydrogen to lower its dewpoint includes removing water from the unreacted hydrogen, thus to maintain the water partial pressure at a low level thereby to promote catalyst activity. Removing water from the unreacted hydrogen may include cooling the unreacted hydrogen to condense at least some of the water and removing the aqueous condensate. Removing water from the unreacted hydrogen may also include contacting the unreacted hydrogen with a water adsorbent or dessicant. Suitable water adsorbents are well-known to those skilled in the art and are easily identified from literature. Some of the $NH_3$ may also be adsorbed by the water adsorbent. It will thus be appreciated that water and some of the $NH_3$ present in the unreacted hydrogen may thus simultaneously be removed from the unreacted hydrogen in a common process step or unit operation.

The process typically includes feeding makeup hydrogen to the activation stage, together with the recycle hydrogen.

The supported Fischer-Tropsch catalyst, i.e. the reduced and activated cobalt catalyst may be loaded into molten wax under an inert atmosphere to prevent the reduced catalyst coming into contact with oxygen from the atmosphere that may oxidize the reduced cobalt to cobalt oxide. The loading of the reduced and activated catalyst into the wax to form a slurry mixture should, obviously, be done at a temperature above the melting temperature of the wax. The slurry mixture of activated cobalt catalyst and wax is then cooled down to room temperature during which the catalyst settles and the mixture solidifies.

The process may include, after having activated the particulate pre-reduction cobalt nitrate-based supported Fischer- Tropsch synthesis catalyst precursor to produce a freshly activated Fischer-Tropsch catalyst, cooling down the freshly activated Fischer-Tropsch catalyst in pure hydrogen to a temperature $T_c$, and thereafter further cooling the activated Fischer-Tropsch catalyst down to room temperature in substantially pure nitrogen. The temperature $T_c$ must be low enough to ensure that nitrogen behaves as an inert during the last leg of this cooling phase. This switch temperature $T_c$ is easily determined by those skilled in the art of producing supported Fischer-Tropsch catalyst, e.g. by using a method as taught by PCT Patent Application No. WO 03/035257, which is incorporated herein by reference.

The particulate pre-reduction cobalt nitrate-based supported Fischer-Tropsch synthesis catalyst precursor may be any suitable cobalt nitrate-based catalyst precursor requiring activation or reduction to obtain an active Fischer-Tropsch catalyst. However, it is preferred that the pre-reduction cobalt nitrate-based supported Fischer-Tropsch synthesis catalyst precursor is obtained by forming a slurry of a particulate catalyst support, cobalt nitrate as an active component precursor, and water; subjecting the catalyst support to impregnation with the cobalt nitrate; drying the impregnated catalyst support; and calcining the impregnated support, to obtain the catalyst precursor. The catalyst precursor thus obtained must, however, then still be activated or reduced prior to using it for catalyzing a Fischer-Tropsch reaction, and this reduction or activation is effected in accordance with the present invention. The resultant catalyst is thus an activated cobalt Fischer-Tropsch synthesis catalyst.

Any commercially available pre-shaped porous oxide catalyst support, such as $Al_2O_3$, silica ($SiO_2$), titania ($TiO_2$), magnesia (MgO), $SiO_2$—$Al_2O_3$ and zinc oxide (ZnO), may be used. The support preferably has an average pore diameter between 8 and 50 nanometers, more preferably between 10 and 15 nanometers. The support pore volume may be between 0.1 and 1.0 ml/g, preferably between 0.3 and 0.9 ml/g. The average particle size is preferably between 1 and 500 micrometers, more preferably between 10 and 250 micrometers, still more preferably between 45 and 200 micrometers.

The support may be a protected modified catalyst support, containing, for example, silicon as modifying component, as described in EP Application No. 99906328.2 (European Publication No. 1058580), which is hence incorporated herein by reference.

The cobalt loading can be between 5 gCo/100 g support and 100 gCo/100 g support, preferably between 20 gCo/100 g support and 70 gCo/100 g support.

The impregnation of the catalyst support may, in principle, be effected by any known method or procedure such as incipient wetness impregnation or slurry phase impregnation. However, the impregnation may, in particular, be effected in the manner described in U.S. Pat. No. 6,455,462 or in U.S. Pat. No. 5,733,839, and which are thus incorporated herein by reference. The support impregnation may thus involve a 2-step slurry phase impregnation process, which is dependent on a desired cobalt loading requirement and the pore volume of the catalyst support.

During the cobalt impregnation step or steps, a water soluble precursor salt of platinum (Pt), palladium (Pd), ruthenium (Ru) or mixtures thereof, may be added, as a dopant capable of enhancing the reducibility of the active component. The mass proportion of this dopant, when used, to cobalt may be between 0,01:100 and 0,3:100.

Calcination of the impregnated and dried material may be done using any method, known to those skilled in the art, for example in a fluidized bed, or a rotary kiln, calciner at 200-350° C. It may, in particular, be effected as described in PCT Patent Application WO 01/39882, which is thus also incorporated herein by reference.

The invention extends also to an activated cobalt Fischer-Tropsch catalyst, when obtained by the process of the invention.

According to a second aspect of the invention, there is provided a process for synthesis of a Fischer-Trospch wax product, the process comprising contacting a synthesis gas comprising hydrogen ($H_2$) and carbon monoxide (CO) at an elevated temperature between 180° C. and 250° C. and an elevated pressure between 10 bar and 40 bar with a catalyst obtained by activating or reducing a particulate pre-reduction cobalt nitrate-based supported Fischer-Tropsch synthesis catalyst precursor containing reducible cobalt oxides in accordance with the process according to the first aspect of the invention, to obtain hydrocarbons by means of a slurry phase Fischer-Tropsch reaction of the hydrogen with the carbon monoxide.

The invention extends to a Fischer-Tropsch wax product containing less than 50 mass ppm submicron particulates of cobalt, the wax product being produced by the process according to the second aspect of the invention.

The invention will now be described in more detail with reference to the following drawings and in the accompanying non-limiting example:

EXAMPLE

This example describes a typical preparation of a batch of pre-reduced catalyst precursor suitable for use in the process of the invention to produce a supported Fischer-Tropsch catalyst. The alumina support used in this example was modified with Si by means of slurry phase impregnation and vacuum drying, as described in EP 1058580, which is incorporated herein by reference. The pre-reduced catalyst precursor was prepared by means of slurry phase impregnation followed by vacuum drying, as described in U.S. Pat. No. 6,455,462, which is incorporated herein by reference. The impregnated and dried precursor was subsequently treated by means of a fluidized bed calcination procedure, as described in WO 01/39882, which is incorporated herein by reference. The impregnated, dried and calcined precursor was subsequently activated by means of a reduction procedure as described in WO 03/035257, which is incorporated herein by reference.

Figure 1:
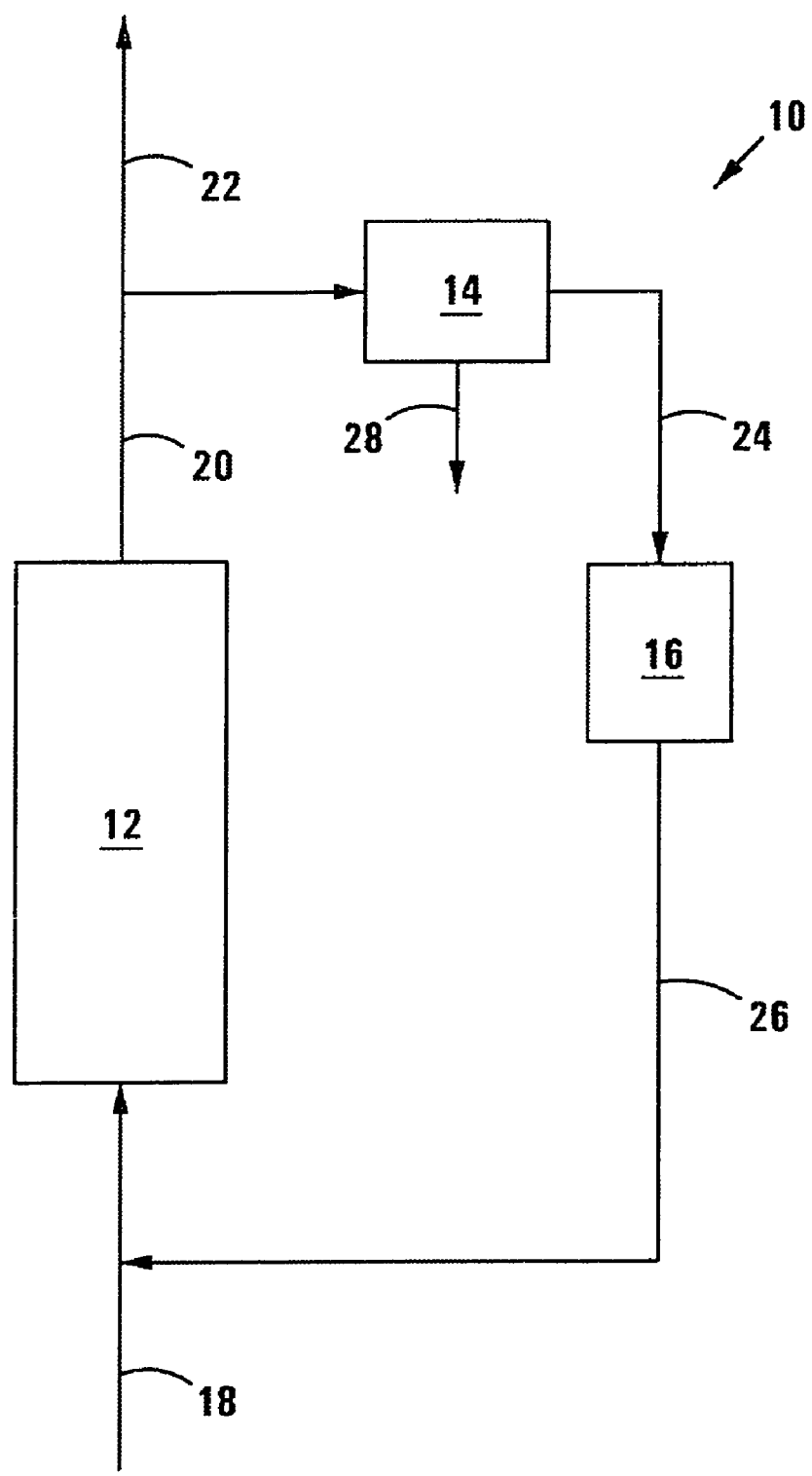
FIG. 1 shows a flow diagram of a process in accordance with the invention for producing a supported Fischer-Tropsch catalyst.

Referring to FIG. 1 of the drawings, reference numeral 10 generally indicates a process in accordance with the invention for producing on a commercial scale a supported active Fischer-Tropsch catalyst. The process 10 includes an activation stage defined by a reduction reactor 12, and further includes a condenser 14 and an adsorber 16. The adsorber 16 includes both an $NH_3$ adsorbent and a water adsorbent.

A hydrogen make-up line 18 leads into the reduction reactor 12 and a wet or unreacted hydrogen line 20 leads from the reactor 12 to the condenser 14, with a flare line 22 branching off from the line 20. A hydrogen line 24 connects the condenser 14 to the adsorber 16. From the adsorber 16, a hydrogen recycle line 26 returns to the hydrogen make-up line 18. A condensate removal line 28 is provided for the condenser 14.

In use, a particulate pre-reduction cobalt nitrate-based supported Fischer-Tropsch synthesis catalyst precursor such as the catalyst precursor produced in accordance with the Example, is loaded into the reduction reactor 12. A reducing gas, comprising at least 90 vol % hydrogen and up to about 10 vol % inerts is fed by means of the hydrogen make-up line 18 into the reduction reactor 12 to contact the catalyst precursor. The reduction reactor 12 is then heated according to a preselected heating programme, which may include several hold times, to a final temperature not exceeding 600° C., preferably a final temperature not exceeding 500° C., and most preferably a final temperature not exceeding 450° C., a hold time at the final temperature, followed by cooling to an unloading temperature not exceeding 180° C. and typically about 140° C. temperature.

Unreacted reducing gas, which thus includes unreacted hydrogen, any gaseous products formed during the reduction of the catalyst precursor and any gaseous substances removed from the catalyst precursor, is withdrawn from the reduction reactor 12 by means of the wet hydrogen line 20 and fed to the condenser 14. This gas includes moisture and $NH_3$. A small portion of the gas is purged by means of the flare line 22. In the condenser 14, the gas is cooled to condense moisture with the aqueous condensate formed being removed by means of the condensate removal line 28. The gas is then fed by means of the hydrogen line 24 to the adsorber 16 where the water adsorbent is used to polish the gas in order further to remove moisture and the $NH_3$ adsorbent is used to remove $NH_3$. The gas, now substantially free of moisture and $NH_3$, is returned as recycle hydrogen to the reduction reactor 12 by means of the hydrogen recycle line 26. Make-up hydrogen is added by means of the hydrogen make-up line 18 to compensate for hydrogen consumed in the reduction reactor 12 and hydrogen purged via the flare line 22.

During the activation of the catalyst precursor in the reduction reactor 12, reducible cobalt oxides are thus reduced to cobalt over a period of time to produce an active Fischer-Tropsch catalyst which contains cobalt crystallites as active component of the catalyst. Over this period of time, there is a distinct time interval during which predominantly CoO is reduced to Co. This time interval can be identified by studying dewpoint data for the gas withdrawn from the reduction reactor 12, or hydrogen consumption data for the reduction reactor 12, or both.

Figure 2:
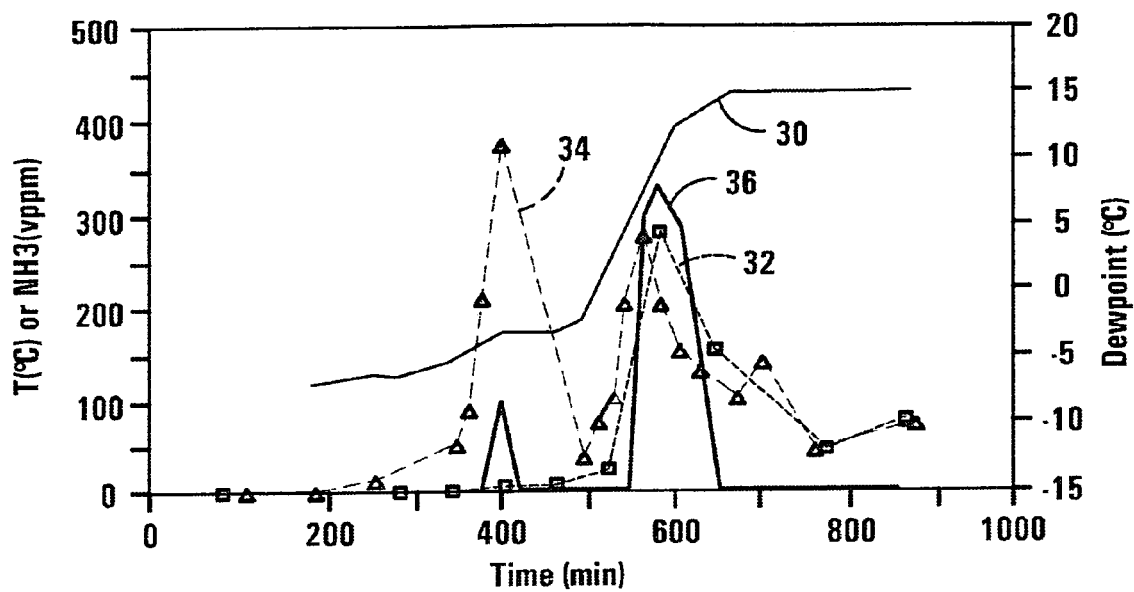
FIG. 2 shows graphs of some measured parameters as a function of time in an activation stage of a conventional process for producing a supported Fischer-Tropsh catalyst.

FIG. 2 shows graphs of reactor temperature, $NH_3$ concentration in the reduction gas entering the reactor 12, $NH_3$ concentration in the gas withdrawn from the reactor 12, and the dewpoint of the gas withdrawn from the reactor 12, as a function of time, for a process identical to the process 10 but in which the $NH_3$ adsorbent in the adsorber 16 is absent. The temperature is indicated by graph 30, the $NH_3$ concentration in the reducing gas feed is indicated by graph 32, the $NH_3$ concentration in the gas withdrawn from the reactor 12 is indicated by graph 34 and the dewpoint of the gas withdrawn from the reactor 12 is indicated by graph 36. As will be noted, the dewpoint graph shows two distinct peaks. The second peak, occurring after about 600 minutes identifies the time interval during which predominantly CoO is reduced to Co. As will also be noted, most of the $NH_3$ is generated earlier, after about 400 minutes, with the $NH_3$ that is recycled then leading to a second ammonia peak at about the same time as when predominantly CoO is reduced to Co, i.e. coinciding with the second dewpoint peak. Thereafter, as a result of the purging of ammonia from the process 10 via the flare line 22, the ammonia concentration in the reducing gas fed to the reactor 12 as well as in the gas withdrawn from the reactor 12 gradually decreases.

Figure 3:
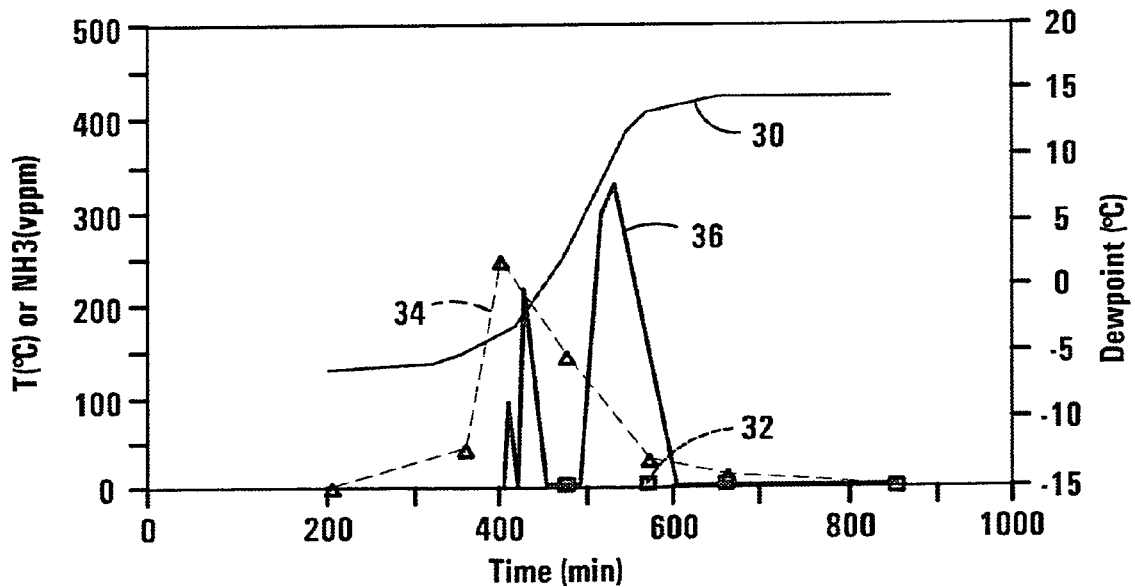
FIG. 3 shows graphs of some measured parameters as a function of time in the activation stage of the process of the invention.

FIG. 3 shows graphs for the same parameters as shown in FIG. 2, but for the process 10 in which both the water adsorbent and the $NH_3$ adsorbent in the adsorber 16 are present. The same reference numerals are used in FIG. 3 to indicate the graphs for the same parameters as are used in FIG. 2. As will be noted, as a result of the presence of the $NH_3$ adsorbent in the adsorber 16, there is substantially no $NH_3$ present in the hydrogen recycled to the reduction reactor 12. During the time interval when predominantly CoO is reduced to Co, as indicated by the dewpoint peak between about 500 minutes and about 600 minutes, the $NH_3$ concentration in the gas withdrawn from the reactor 12 during this time interval is less than about 150 vppm and declining, reaching a value of about 70 vppm at the second dewpoint maximum. It is to be noted that, although different batches of catalyst precursor was used in the processes which produced FIGS. 2 and 3, the catalyst precursor batches were very similar and the operating conditions were identical, apart from the presence of the $NH_3$ adsorbent in the adsorber 16.

The active Fischer-Tropsch catalyst obtained from the process producing the graphs of FIG. 2 and the active Fischer-Tropsch catalyst obtained from the process producing the graphs of FIG. 3 were each suspended in molten wax at about 140° C. and cooled down to room temperature. During the cooling down process the active Fischer-Tropsch catalyst settled and the mixture of settled catalyst and wax solidified. The process of settling and solidification ensures a catalyst layer at the bottom of the solidified mixture and a wax layer (i.e. wax supernatant) on top of the settled catalyst. After solidification the wax supernatant was analysed to determine the cobalt concentration therein. The cobalt concentration in the wax supernatant of the conventionally produced Fischer-Tropsch catalyst was 346 mass ppm, whereas the cobalt concentration in the supernatant of the catalyst produced in accordance with the process of the invention was only 6 mass ppm.

From the above it can be concluded that the active Fischer-Tropsch catalyst produced by the process of the invention shows a cobalt concentration in the wax supernatant of the reduced, wax-coated and settled Fischer-Tropsch catalyst which is surprisingly superior (i.e. lower) than the cobalt concentration in the wax supernatant of the reduced, wax-coated and settled Fischer-Tropsch catalyst produced conventionally. Although not wishing to be bound by theory, the Applicant believes that this is due to the low $NH_3$ concentration in the reduction reactor during the time interval when predominantly CoO is reduced to Co. By means of the process of the invention, the Applicant believes that an active Fischer-Tropsch catalyst which contains cobalt crystallites as active component of the catalyst can be produced which surprisingly will result in a slurry phase Fischer-Tropsch synthesis process that will produce a high quality wax product (i.e. less than 50 mass ppm cobalt contamination) immediately after process start up with a fresh catalyst inventory, or immediately after any on-line addition of fresh catalyst.

The invention claimed is:
1. A process for producing a supported Fischer-Tropsch catalyst, which process includes
   treating, in an activation stage, a cobalt supported Fischer-Tropsch synthesis catalyst precursor containing reducible cobalt oxides, with hydrogen as a reducing gas for a period of time effective to reduce the cobalt oxides to Co, wherein ammonia and water are formed;

withdrawing unreacted hydrogen, which thus includes water, from the activation stage, treating the withdrawn unreacted hydrogen to lower its dewpoint and returning at least a portion of the withdrawn unreacted hydrogen to the activation stage as recycle hydrogen; and maintaining an ammonia concentration in the activation stage, at least during the time when predominantly CoO is reduced to Co, of less than 250 volume parts per million ("vppm").

2. The process as claimed in claim 1, wherein the ammonia concentration in the activation stage is maintained, at least during the time when predominantly CoO is reduced to Co, at less than 70 vppm.

3. The process as claimed in claim 2, wherein the ammonia concentration in the activation stage is maintained, at least during the time when predominantly CoO is reduced to Co, at less than 45 vppm.

4. The process as claimed in claim 1, wherein maintaining the ammonia concentration in the activation stage, at least during the time when predominantly CoO is reduced to Co, at less than 250 vppm includes removing $NH_3$ from the unreacted hydrogen withdrawn from the activation stage.

5. The process as claimed in claim 1, wherein water and some of the $NH_3$ present in the unreacted hydrogen are simultaneously removed from the unreacted hydrogen in a common process step or unit operation.

* * * * *